(12) United States Patent
Hibino

(10) Patent No.: US 12,450,892 B2
(45) Date of Patent: Oct. 21, 2025

(54) SOLID-STATE IMAGING DEVICE, ELECTRONIC APPARATUS, AND IMAGING SYSTEM

(71) Applicant: Sony Semiconductor Solutions Corporation, Kanagawa (JP)

(72) Inventor: Tomokazu Hibino, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 604 days.

(21) Appl. No.: 17/794,036

(22) PCT Filed: May 1, 2020

(86) PCT No.: PCT/JP2020/018405
§ 371 (c)(1),
(2) Date: Jul. 20, 2022

(87) PCT Pub. No.: WO2021/152877
PCT Pub. Date: Aug. 5, 2021

(65) Prior Publication Data
US 2023/0050259 A1 Feb. 16, 2023

Related U.S. Application Data

(60) Provisional application No. 62/967,869, filed on Jan. 30, 2020.

(51) Int. Cl.
*G06V 10/82* (2022.01)
*G06V 10/774* (2022.01)
(Continued)

(52) U.S. Cl.
CPC ............ *G06V 10/82* (2022.01); *G06V 10/774* (2022.01); *G06V 10/95* (2022.01); *H04N 25/771* (2023.01); *H04N 25/772* (2023.01)

(58) Field of Classification Search
CPC ...... G06V 10/82; G06V 10/774; G06V 10/95; G06V 10/454; G06V 10/764; G06V 20/52;
(Continued)

(56) References Cited

U.S. PATENT DOCUMENTS 6,839,452 B1   1/2005   Yang
8,520,130 B2   8/2013   Sasaki
(Continued)

FOREIGN PATENT DOCUMENTS

CN   1705347 A    12/2005
CN   103988490 A   8/2014
(Continued)

OTHER PUBLICATIONS

Amir Mohammad Faisal et al: "3-D Stacked Image Sensor With Deep Neural Network Computation", IEEE Sensors Journal, IEEE, USA, vol. 18, No. 10, May 15, 2018 (May 15, 2018), pp. 4187-4199, XP011681876, ISSN: 1530-437X, DOI: 10.1109/JSEN.2018.2817632 [retrieved on Apr. 23, 2018].
(Continued)

*Primary Examiner* — Michael S Osinski
(74) *Attorney, Agent, or Firm* — Michael Best & Friedrich LLP

(57) ABSTRACT

To improve the accuracy of the recognition processing used in an image sensor. A solid-state imaging device includes a pixel array, a converter, an image processing unit, a digital signal processing unit, and a control unit. The pixel array has a plurality of pixels that perform photoelectric conversion. The converter converts an analog pixel signal output from the pixel array into digital image data. The image processing unit performs image processing on the digital image data. The digital signal processing unit performs recognition processing on the digital image data output by the image
(Continued)

processing unit. The control unit performs optimization regarding at least one acquisition processing operation among acquisition of the analog pixel signal, acquisition of the digital image data, and acquisition of a result of the recognition processing based on the result of the recognition processing.

15 Claims, 6 Drawing Sheets

(51) Int. Cl.
    *G06V 10/94*     (2022.01)
    *H04N 25/771*     (2023.01)
    *H04N 25/772*     (2023.01)

(58) Field of Classification Search
    CPC .... G06V 40/171; G06V 10/22; H04N 25/771; H04N 25/772; H04N 25/79; H04N 23/61; H04N 23/617; H04N 23/635; H04N 23/62; H04N 23/672; H04N 23/675; H04N 7/188; G06T 2207/30232; G06T 2207/10016; G06T 7/254
    See application file for complete search history.

(56) References Cited

U.S. PATENT DOCUMENTS

| | | | |
|---|---|---|---|
| 9,438,868 B2* | 9/2016 | Boettiger | H04N 23/61 |
| 10,025,950 B1* | 7/2018 | Avasarala | G06F 18/23213 |
| 10,686,979 B2* | 6/2020 | Minami | H04N 23/62 |
| 10,795,024 B2 | 10/2020 | Eki | |
| 2005/0265626 A1* | 12/2005 | Endo | H04N 23/74 |
| | | | 382/274 |
| 2008/0181508 A1* | 7/2008 | Kaneda | G06V 40/175 |
| | | | 382/190 |
| 2015/0229889 A1* | 8/2015 | Boettiger | H04N 23/71 |
| | | | 348/262 |
| 2017/0061216 A1* | 3/2017 | Kim | G06V 10/431 |
| 2018/0040584 A1 | 2/2018 | Kang | |
| 2018/0349709 A1* | 12/2018 | Shinohara | G06V 20/52 |
| 2019/0028653 A1* | 1/2019 | Minami | H04N 23/62 |
| 2019/0268532 A1 | 8/2019 | Iinuma | |
| 2019/0362155 A1* | 11/2019 | Croxford | G06V 10/764 |
| 2021/0209466 A1* | 7/2021 | Gomi | G06N 3/063 |
| 2021/0227126 A1* | 7/2021 | Se | G06V 10/764 |
| 2024/0259700 A1* | 8/2024 | Hasegawa | H04N 5/2628 |
| 2025/0062864 A1* | 2/2025 | Wang | H04L 1/1887 |

FOREIGN PATENT DOCUMENTS

| | | |
|---|---|---|
| CN | 108460395 A | 8/2018 |
| CN | 109691079 A | 4/2019 |
| CN | 110210581 A | 9/2019 |
| JP | 2008017259 A | 1/2008 |
| JP | 2014115814 A | 6/2014 |
| JP | 2017079281 A | 4/2017 |
| JP | 2017224025 A | 12/2017 |
| JP | 2019146058 A | 8/2019 |
| WO | 2012093381 A1 | 7/2012 |
| WO | 2018/051809 A1 | 7/2017 |

OTHER PUBLICATIONS

International Search Report (PCT/ISA/210), International Application No. PCT/JP2020/018405, dated Jul. 14, 2020.

* cited by examiner

SOLID-STATE IMAGING DEVICE, ELECTRONIC APPARATUS, AND IMAGING SYSTEM

CROSS REFERENCE TO RELATED APPLICATIONS

This application is a related application to U.S. Provisional Patent Application No. 62/967,869 filed on Jan. 30, 2020, claiming priority under this provisional application, the entire content of which is incorporated by reference herein.

TECHNICAL FIELD

The present disclosure relates to solid-state imaging devices, electronic apparatuses, and imaging systems.

BACKGROUND ART

In recent years, various kinds of signal processing have been required to be performed at a high speed on image data captured by image sensors. Also, semiconductor devices in which a plurality of chips such as image sensor chips, memory chips, and signal processing chips are connected by bumps into packages and semiconductor devices in which dies including image sensors disposed therein and dies including memories, signal processing circuits, and the like disposed therein are laminated into packages have been proposed with development of semiconductor process technologies.

In a case in which semiconductor devices incorporating image sensors and signal processing circuits (hereinafter, referred to as imaging devices) are mounted in electronic apparatus such as smartphones, the signal processing circuits in the imaging devices perform various kinds of signal processing in response to commands from application processors mounted in the electronic apparatus in many cases. For example, by executing neural network processing in a signal processing circuit and outputting the result, it is possible to improve the latency of transmitting the captured image to the outside and then processing it and improve the privacy and security by transmitting the captured image to the outside. Therefore, there is a demand for a technique for improving the recognition rate of a neural network used when performing estimation processing or the like with a built-in signal processing circuit.

CITATION LIST

Patent Literature

[PTL 1]
  WO 2018/051809 A1

SUMMARY

Technical Problem

Therefore, the present disclosure provides a solid-state imaging device, an electronic apparatus, and an imaging system that can improve the accuracy of processing by a neural network used in an image sensor.

Solution to Problem

According to one embodiment, a solid-state imaging device includes: a pixel array having a plurality of pixels performing photoelectric conversion; a converter that converts an analog pixel signal output from the pixel array into digital image data; an image processing unit that performs image processing on the digital image data; a digital signal processing unit that performs recognition processing on the digital image data output by the image processing unit; and a control unit that performs optimization regarding at least one acquisition processing operation among acquisition of the analog pixel signal, acquisition of the digital image data, and acquisition of a result of the recognition processing based on the result of the recognition processing.

The control unit may feed back the result of the recognition processing to execute the optimization.

The control unit may perform optimization regarding at least one acquisition processing operation among acquisition of the analog pixel signal, acquisition of the digital image data, and acquisition of the result of the recognition processing when a recognition rate of the recognition processing has decreased.

The control unit may control an exposure time of the pixels of the pixel array.

The control unit may optimize parameters related to image processing of the image processing unit.

The digital signal processing unit may execute recognition processing using a trained neural network model.

The control unit may retrain the neural network model.

The solid-state imaging device may further include a semiconductor device including: a first substrate on which the pixel array is arranged; and a second substrate which is laminated on the first substrate, and on which the converter, the image processing unit, the digital signal processing unit, and the control unit are arranged.

The first substrate and the second substrate may be bonded by any of a CoC (Chip on Chip) method, a CoW (Chip on Wafer) method, and a WoW (Wafer on Wafer) method.

The solid-state imaging device may further include a selector for selecting output from at least one of the converter, the image processing unit, and the digital signal processing unit and outputting the data to the outside.

When outputting image information, only information in a region of interest may be selected and output.

When outputting image information, information in a region of interest and information in the other region may be output using different compression methods.

The information in the region of interest and information in the other region may be compressed with different compression rates and output.

When the recognition rate in the recognition processing has decreased, the image information and the result of the recognition processing may be output together.

According to one embodiment, an electronic apparatus includes the solid-state imaging device described above; and an application processor on a substrate independent of the semiconductor device, wherein the application processor inputs/outputs data via the selector.

According to one embodiment, an imaging system includes: the solid-state imaging device described above; and a server connected to the solid-state imaging device via a network, wherein the solid-state imaging device outputs an output of the converter and/or an output of the image processing unit, with an output of the digital signal processing unit to the server in association, and the server performs optimization regarding at least one acquisition processing operation among acquisition of the analog pixel signal, acquisition of the digital image data, and acquisition of a result of the recognition processing based on the received information and deploys the optimized information to the solid-state imaging device.

DESCRIPTION OF EMBODIMENTS

Hereinafter, embodiments of an imaging device and electronic apparatus will be described with reference to the drawings. Although main components of the imaging device and the electronic apparatus will be mainly described below, the imaging device and the electronic apparatus may include components and functions that are not illustrated or explained. The following description is not intended to exclude components and functions that are not illustrated or explained.

First Embodiment

Figure 1:
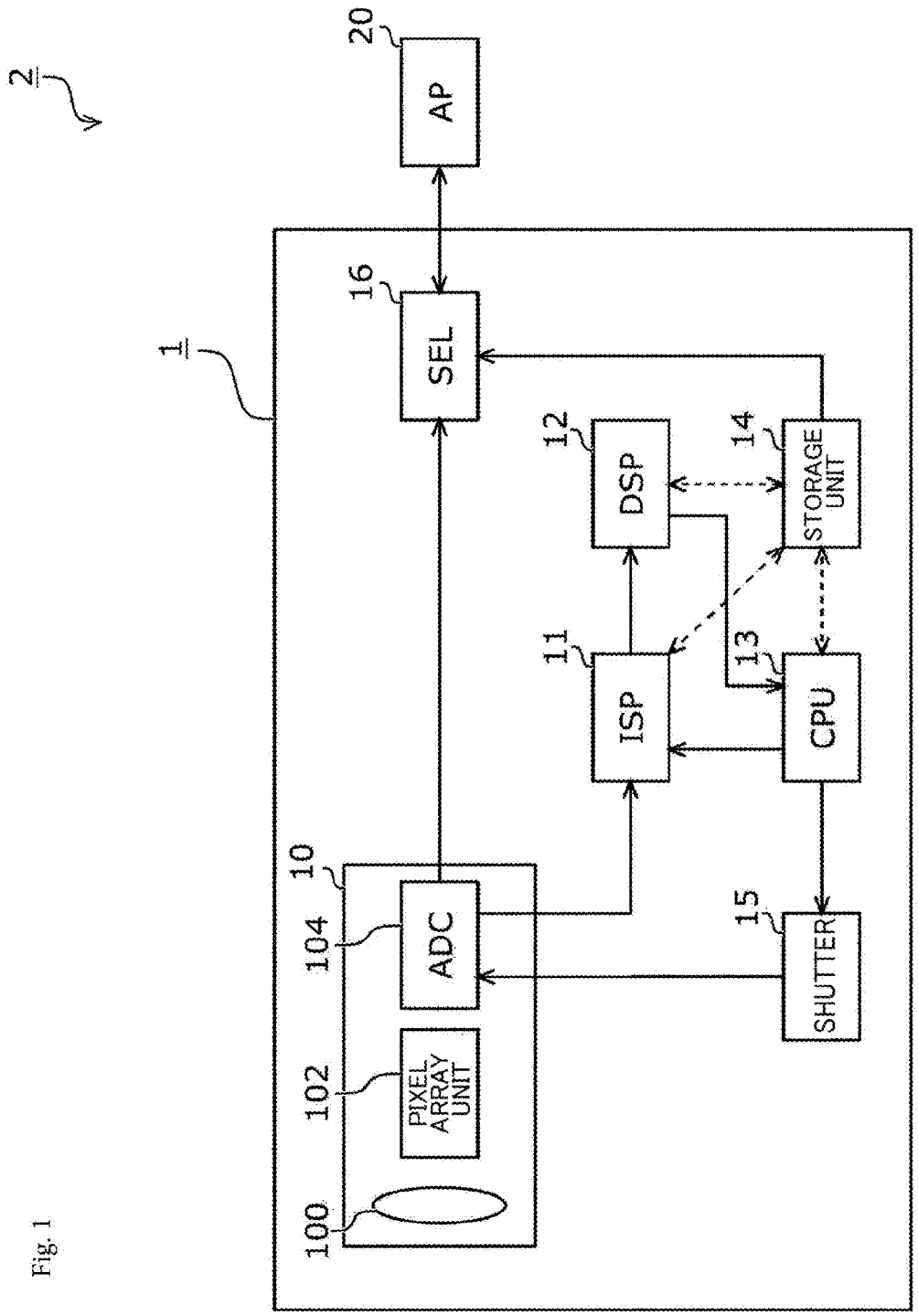
FIG. 1 is a block diagram showing an outline of an electronic apparatus including an imaging device according to an embodiment.

FIG. 1 is a block diagram showing a schematic configuration of an electronic apparatus 2 including an imaging device 1 according to an embodiment. The electronic apparatus 2 includes an imaging device 1 and an application processor (hereinafter referred to as AP 20). The electronic apparatus 2 is a smartphone, a mobile phone, a tablet terminal, a PC, a digital camera, a digital video camera, or the like having an imaging function, and the specific mode of the apparatus is not limited.

The imaging device 1 can be realized as one semiconductor device. This semiconductor device may also be referred to as an image sensor or a solid-state imaging device. The imaging device 1 includes at least a CMOS image sensor (hereinafter referred to as CIS 10), an image processing unit (hereinafter referred to as ISP 11), a digital signal processing unit (hereinafter referred to as DSP 12), a control unit (hereinafter referred to as CPU 13), a storage unit 14, a shutter 15, and a selector (hereinafter referred to as SEL 16).

The CIS 10 is an image sensor having an optical system 100, an imaging unit including a pixel array 102, and an analog-to-digital conversion circuit (hereinafter referred to as ADC 104).

The optical system 100 includes, for example, a zoom lens, a single focus lens, an aperture, and the like. The optical system 100 guides the incident light to the pixel array 102.

The pixel array 102 has a plurality of pixels arranged in a two-dimensional direction. Each pixel may be composed of a plurality of unit pixels of a plurality of colors such as RGB. Each unit pixel has a light receiving element such as a photodiode. The light receiving element photoelectrically converts the incident light and outputs an analog pixel signal. The light incident on the imaging unit is imaged on a light receiving surface in which a plurality of light receiving elements are arranged via the optical system 100, and each light receiving element accumulates electric charges according to the intensity of the incident light and outputs an analog pixel signal corresponding to the amount of accumulated electric charges.

The ADC 104 converts the analog pixel signal output from the pixel array 102 into digital image data. Since the ADC 104 performs A/D conversion, the ISP 11, DSP 12, CPU 13, storage unit 14, shutter 15 and SEL 16 on the subsequent stage of the ADC 104 handle digital image data. A voltage generation circuit that generates a drive voltage for driving the imaging unit from a power supply voltage or the like supplied to the imaging device 1 may be provided inside the ADC 104 or separately from the ADC 104. Further, a digital-to-analog conversion circuit (DAC) required to realize A/D conversion of the ADC 104 may be separately provided.

The ISP 11 performs various image processing on digital image data. The ISP 11 may perform image processing on the digital image data output from the CIS 10 or may perform image processing on the digital image data output from the CIS 10 and stored in the storage unit 14. The ISP 11 performs image processing in response to external instructions. For example, the ISP 11 converts digital image data so that the data is suitable for signal processing by the DSP 12. Hereinafter, the digital image data is simply referred to as an image, image data, or the like.

The DSP 12 has a function of an information processing unit that executes at least one processing operation such as predetermined recognition processing and detection processing based on the image data processed by the ISP 11. That is, the DSP 12 executes recognition processing and the like on the data and the like processed by the ISP 11. The DSP 12 may execute predetermined processing based on the result of executing the recognition processing or the like. For example, the DPS 12 may input image data processed by the ISP 11 into a pre-trained learned neural network model to perform object recognition and the like. Then, the DSP 12 may execute processing for improving the accuracy of the neural network model based on the result of this recognition or the like. The neural network model is, for example, trained by deep learning, but is not limited to this, and may be another model that can be retrained. When using pre-trained data, for example, a trained parameter may be stored in the storage unit 14 and a neural network model may be formed based on this parameter.

The CPU 13 controls each unit in the imaging device 1 according to an instruction from the AP 20 or the like. The CPU 13 may execute predetermined processing based on the program stored in the storage unit 14. This CPU 13 may be integrated with the DSP 12. That is, the CPU 13 may be formed as a configuration capable of realizing the processing of the DSP 12 described above. The CPU 13 may set the imaging conditions of the CIS 10 based on the result of the recognition of the DSP 12. In the present disclosure, the exposure time is controlled as an example, but as will be described later, the present invention is not limited to this processing, and various types of processing that can be processed by the ISP 11 may be controlled.

The DSP 12 executes arithmetic processing using a machine-learned calculation model by, for example, executing a program stored in the storage unit 14. The ISP 11 and the CPU 13 may also execute various operations by executing the program stored in the storage unit 14. Various pieces of information about the learned calculation model, various pieces of information used for various types of processing, and programs are stored in the storage unit 14 in advance. The ISP 11, DSP 12, and CPU 13 read necessary information from the storage unit 14 and execute arithmetic processing.

The processing related to the machine learning model by the DSP 12 is, for example, a calculation model by a deep neural network (hereinafter referred to as DNN) trained by deep learning as described above. This calculation model can be designed based on the parameters generated by inputting the output data of the ISP 11 as an input and inputting the learning data having a label associated with this input into the learned calculation model.

The DSP 12 can execute, for example, predetermined recognition processing by arithmetic processing using the DNN. Here, the recognition processing is processing of automatically recognizing whether or not the image data, which is the output data of the ISP 11, contains characteristic image information. More specifically, the recognition processing is processing for performing an arithmetic operation by giving input data to the calculation model formed by the parameter generated through machine learning, and the input data is output data of the ISP 11.

The DSP 12 may perform a product-sum operation between the dictionary coefficient stored in the storage unit 14 and the image data in the processing of executing the arithmetic processing based on the learned calculation model stored in the storage unit 14. The calculation result by the DSP 12 is stored in the storage unit 14 and output to the SEL 16. The result of the arithmetic processing using the calculation model by the DSP 12 may be image data or various pieces of information (metadata) obtained from the image data. The DSP 12 or the CPU 13 described above may have a memory controller function for controlling writing and reading to the storage unit 14, or a memory controller may be provided separately from the DPS 12 and the CPU 13. The DSP 12 may execute detection processing such as motion detection processing, face detection processing, or the like. The detection processing may be performed by the ISP 11 instead of the DSP 12. Alternatively, the ISP 11 and the DSP 12 may cooperate to execute the detection processing.

The storage unit 14 stores digital pixel data output from the CIS 10, programs executed by the ISP 11, DSP 12, and CPU 13, and various pieces of information related to learned calculation models used by the DSP 12 for arithmetic processing. The storage unit 14 may store data related to the progress of the calculation processing of each of the above-mentioned units and the calculation result. The storage unit 14 is, for example, a readable and writable random access memory (RAM). By exchanging the information about the calculation model in the storage unit 14, each of the above-mentioned units can execute various operations, and can realize highly versatile and wide-applicable processing. When each of the above-mentioned units executes arithmetic processing based on a calculation model for a specific purpose, the storage unit 14 may include a ROM (Read Only Memory) as a part thereof.

The shutter 15 controls the exposure time in the CIS 10 according to the control from the CPU 13. For example, if the CPU 13 determines that it is too bright for the DSP 12 to perform the recognition, the shutter 15 shortens the exposure time. On the contrary, when it is dark, the shutter 15 increases the exposure time. The shutter 15 may not be provided outside the CIS 10 but may be provided inside the CIS 10. The shutter 15 may be an analog shutter or a digital shutter.

The SEL 16 selects and outputs the output data processed by the DSP 12 based on the selection control signal from the CPU 13. The data to be output may be the output of the DSP 12 as it is, or may be the data stored in the storage unit 14 by the DSP 12. In some cases, the SEL 16 may select and output the digital pixel data output by the ADC 104 based on the control signal from the CPU 13. The SEL 16 outputs the data required for the AP 20 via an interface such as MIPI (Mobile Industry Processor Interface) or I2C (Inter-Integrated Circuit).

The AP 20 is a semiconductor device that is separated from the imaging device 1 and is mounted on the same base substrate as that of the imaging device 1 or mounted on a base substrate that is different from that of the imaging device 1. The AP 20 includes therein a CPU that is different from the CPU 13 of the imaging device 1 and executes programs of an operating system, various kinds of application software, and the like. The AP 20 may be provided with a DSP different from the DSP 12 of the imaging device 1, and various types of signal processing may be executed by the DSP. The DSP in the AP 20 may be able to execute more advanced signal processing than the ISP 11, DSP 12, and the like in the imaging device 1 at a higher speed.

Additionally, the AP 20 may be provided with functions of performing image processing, signal processing, and the like of a graphics processing unit (GPU), a baseband processor, and the like. The AP 20 may execute various types of processing on the image data and the calculation result from the imaging device 1 as necessary, and may perform control to display the image together with the identification result on the display unit of the electronic apparatus 2. The AP 20 may transmit data related to the processing result or the recognition result to an external cloud server via a predetermined wired or wireless network.

Note that as the predetermined network, various communication networks such as the Internet, a wired local area network (LAN), a wireless LAN, a mobile body communication network, and a near field wireless communication such as Bluetooth (registered trademark) can be applied, for example. The destination of image data and calculation results is not limited to a cloud server, but may be various information processing devices having a communication function such as a stand-alone server, a file server, and a communication terminal such as a mobile phone.

FIG. 1 shows an example in which the AP 20 sends an instruction to the imaging device 1. In the following, an example in which the AP 20 sends an instruction to the imaging device 1 will be described, but the actual implementation is not limited to this form, and the following description is to be interpreted to include a case in which a processor other than the AP 20 sends an instruction to the imaging device 1.

Figure 2:
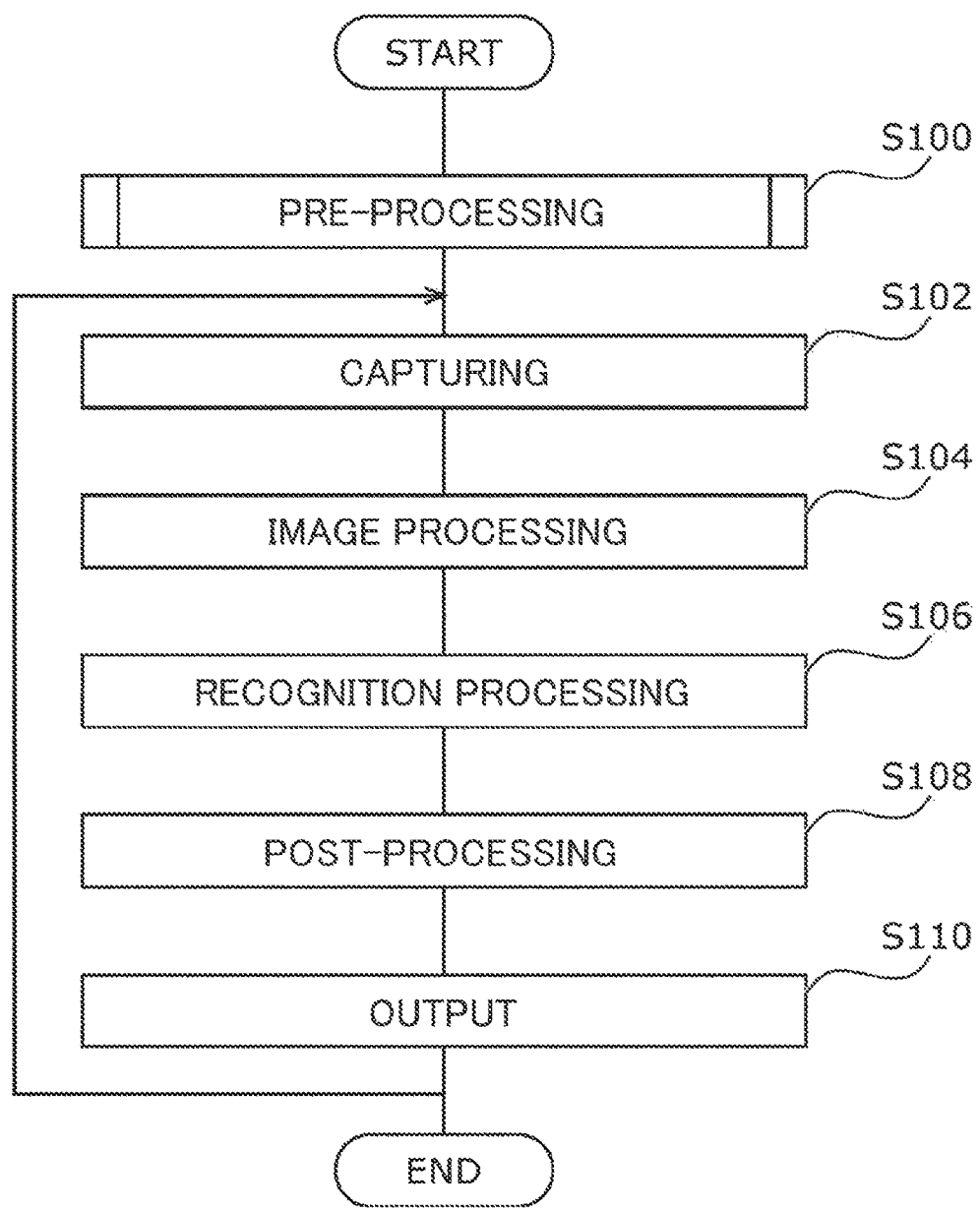
FIG. 2 is a block diagram showing processing of an imaging device according to an embodiment.

FIG. 2 is a flowchart showing imaging processing according to an embodiment. The imaging device 1 executes the imaging processing based on this flowchart. The imaging device 1 is installed so as to capture a predetermined range of a factory line, for example. This is shown as an example, and the imaging device can be applied without limitation to this example as long as the recognition processing is performed. Further, the imaging device may perform other inference processing instead of recognition processing.

First, the imaging device 1 executes pre-processing (S100). The pre-processing is, for example, processing of determining whether or not the object to be recognized is appropriately acquired as image data by capturing, and setting capturing conditions and the like.

Figure 3:
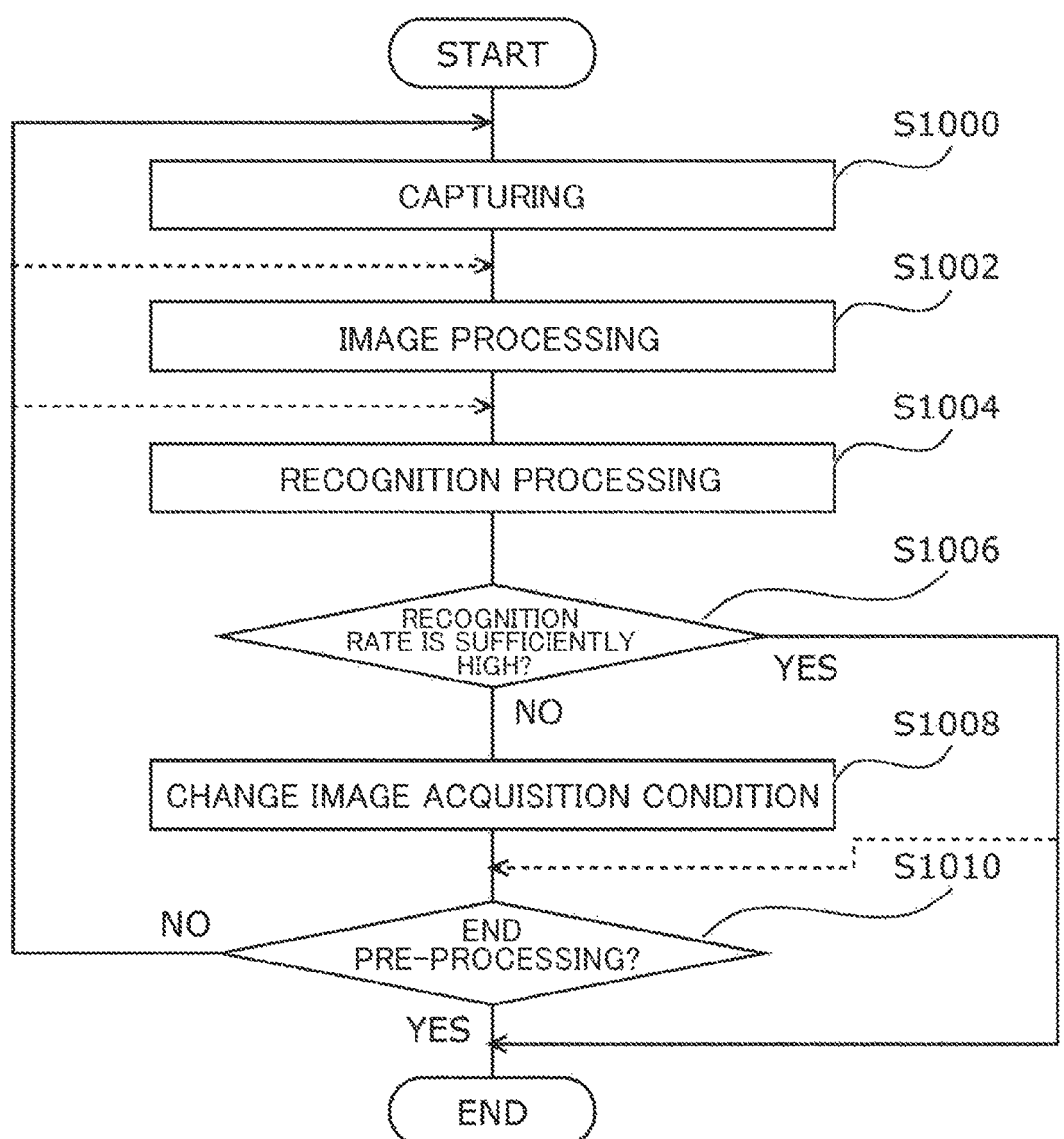
FIG. 3 is a block diagram showing processing of an imaging device according to an embodiment.

FIG. 3 is a flowchart showing this pre-processing according to the embodiment.

First, as the pre-processing, the CIS 10 executes capturing and acquires an image (S1000).

Next, the ISP 11 performs appropriate image processing on the acquired image (S1002). This image processing includes, for example, various types of filtering processing such as sharpening processing, resolution conversion, gain adjustment, dynamic range conversion processing, area cropping processing, color correction, color conversion, parameters related to normalization processing, and the like. In addition, in order to convert the image into an image suitable for the recognition processing described later, image enlargement, reduction, rotation, and distortion correction processing may be executed. When the image to be acquired is a moving image, acquisition of an optical flow or the like may be executed.

Next, the DSP 12 executes the recognition processing using the image that has been subjected to the predetermined image processing by the ISP 11 (S1004). This recognition processing is processing of recognizing whether or not it is possible to recognize, for example, that an operator is present at an appropriate position on the line, an object is passing through an appropriate position on the line, and the like.

Next, the CPU 13 determines the result recognized by the DSP 12 and determines whether the recognition rate is sufficiently high (S1006). For example, the CPU 13 compares the recognition rate recognized by the DSP 12 with a predetermined value, and determines whether the recognition rate is sufficiently high or not. This recognition rate may be calculated based on the number of images that have been successfully recognized for a predetermined number of captured images or more. For example, the recognition rate may be calculated using frame images captured continuously in a predetermined number or more.

If the recognition rate is not sufficiently high (S1006: NO), the CPU 13 changes the image acquisition conditions (S1008). The image acquisition conditions may be image capturing conditions, for example, conditions related to the exposure time of the shutter 15, or conditions related to image processing such as filter coefficients in the ISP 11, for example, filter coefficients, gain adjustment conditions, or the like. By changing the image acquisition conditions in this way, the imaging device 1 executes the setting of parameters having a high recognition rate as pre-processing.

The image acquisition condition may be a plurality of combinations of the above-mentioned conditions. For example, it may be a combination of parameters related to the CIS 10, parameters related to the ISP 11, and parameters related to the DSP 12.

If the recognition rate is sufficiently high (S1008: YES), the pre-processing may be terminated. Alternatively, the determination of the termination of pre-processing may be executed.

Next, the CPU 13 determines whether or not to end the pre-processing (S1010). The determination of this pre-processing may obtain a recognition rate sufficiently higher than a predetermined recognition rate. Further, as another condition, for example, the exposure time by the shutter 15 may be changed from the shortest exposure time determined in advance to the longest exposure time, and then the recognition rate may be acquired. In this case, the CPU 13 may set the parameter with the highest recognition rate as the image acquisition condition. Although described as the exposure time, of course, other image acquisition conditions may be optimized in this way as described above.

If it is determined to end the pre-processing (S1010: YES), the CPU 13 ends the pre-processing.

On the other hand, if it is determined that the pre-processing is not to be ended (S1010: NO), the CPU 13 may repeat the processing from the capturing (S1000) in the CIS 10. As another example, when the filter of the image that has already been acquired is adjusted, the processing from the image processing (S1002) may be repeated. When the conditions used for the recognition processing are changed in S1008, the processing from the recognition processing (S1004) may be repeated. When a plurality of combinations of conditions are used, all of the combinations of the plurality of conditions or a combination of some conditions appropriately selected from all the combinations may be used.

Returning to FIG. 2, the processing after the pre-processing will be described.

After the pre-processing is completed, the CIS 10 starts capturing to execute the actual recognition processing (S102). The captured image may be, for example, a still image or a moving image. This capturing is performed using the capturing parameters set in the pre-processing.

Next, the ISP 11 performs predetermined image processing on the image captured by the CIS 10 (S104). The ISP 11 executes the above-mentioned filtering, gain adjustment, and the like on the image. If the parameter is changed by the pre-processing, the ISP 11 executes the image processing based on the changed parameter.

Next, the DSP 12 executes the recognition processing on the image processed by the ISP 11 (S106). The DSP 12 executes recognition processing such as whether an object has passed a predetermined position, the object is in an appropriate state, or an operator is working properly, for example, on a factory line. In addition, the face recognition of the operator may be executed. For example, the imaging device 1 is fixedly arranged as described above, and appropriately recognizes the situation in a predetermined area of the image acquired from this arrangement.

All the processing operations up to this point can be realized in the imaging device 1. That is, it is possible to acquire the conditions for realizing appropriate recognition processing without outputting data or the like from the inside of the imaging device 1 to the outside of the AP 20 or the like via the interface. This condition can be determined based on the environment by executing the pre-processing as described above. The recognition rate of the recognition processing in S106 may decrease due to changes in the environment. In such a case, the processing from the pre-processing of S100 may be repeated.

Another pre-processing may be performed, for example, by monitoring the recognition rate and executing the pre-processing when the recognition rate falls below a predetermined value. Further, as another example, the pre-processing may be repeated every predetermined time or every predetermined number of shots. In this way, the pre-processing may be repeated periodically.

As described above, according to the present embodiment, it is possible to set parameters and the like that realize recognition processing appropriate for the environment in the state of being closed to the imaging device 1. All the configurations of the imaging device 1 can be mounted on one chip or one laminated semiconductor device as described later. If the CIS 10, ISP 11, DSP 12, CPU 13, storage unit 14, and SEL 16 are mounted on one such semiconductor device, it is possible to set the parameters without outputting information from the semiconductor device to the outside. Therefore, it is possible to protect privacy and security at a higher speed than when outputting data to the outside, and to improve the recognition rate while reducing the system cost.

In the factory line, for example, when sunlight enters the factory, the recognition rate may decrease under the same conditions depending on the sunlight. Even in such a case, according to the present embodiment, it is possible to suppress the decrease in the recognition rate. In addition, it is possible to avoid a decrease in the recognition rate due to changes in various environments, without being limited to sunlight, while maintaining the above-mentioned merits, and to realize a system that is robust to the environment and the like.

According to the example of FIG. 2, the processing is further continued.

After the recognition processing, the CPU 13 may further perform post-processing (S108). This post-processing does not have to be performed for each recognition processing operation, and may be executed in an appropriate span. For example, it may be executed every predetermined time or every predetermined number of shots. Further, as another example, the post-processing may be sequentially executed. The post-processing is processing for improving the accuracy of the recognition processing in the DSP 12. The CPU 13 may retrain the neural network model used by the DSP 12, for example, by feeding back the recognition result by the DSP 12. By using the retrained neural network model, it is possible to further improve the recognition rate. This retraining can also be performed in the imaging device 1, that is, one semiconductor device, similar to the pre-processing described above.

Next, the SEL 16 outputs appropriate data (S110). Appropriate data is, for example, data captured by the CIS 10, data processed by the ISP 11, or data related to the recognition result of the DSP 12. For example, the image may not be output in the normal state, and the image may be output at the timing when an abnormality occurs in the recognition. The recognition rate may be output at all times or may be output only when an abnormality occurs. In this way, the appropriate data is selected and output from the SEL 16 to the AP 20. The data to be output may be temporarily stored in the storage unit 14. For example, at the request from the AP 20, the data stored in the storage unit 14 may be collectively output to some extent. Further, in the SEL 16, data, a request, and the like may be input from the AP 20. The input data, requests, and the like may be stored in the storage unit 14, or may be output to the CPU 13, for example.

As described above, according to the present embodiment, the imaging device 1 can retrain the neural network model for improving the recognition processing without outputting the data to the outside. Similarly to the pre-processing, this processing can be realized without one semiconductor device. Therefore, as in the above, it is possible to protect privacy and security at a higher speed than when outputting data to the outside, and to improve the recognition accuracy while reducing the system cost.

For example, replacing an existing imaging device with a new imaging device generally results in learning costs. In addition, the cost of tuning at each installation location of the imaging device is high. Even in such a case, it is possible to reduce the cost by realizing the optimization of the image acquisition condition and the neural network model in the environment closed to the imaging device 1 as in the present embodiment.

Second Embodiment

Figure 4:
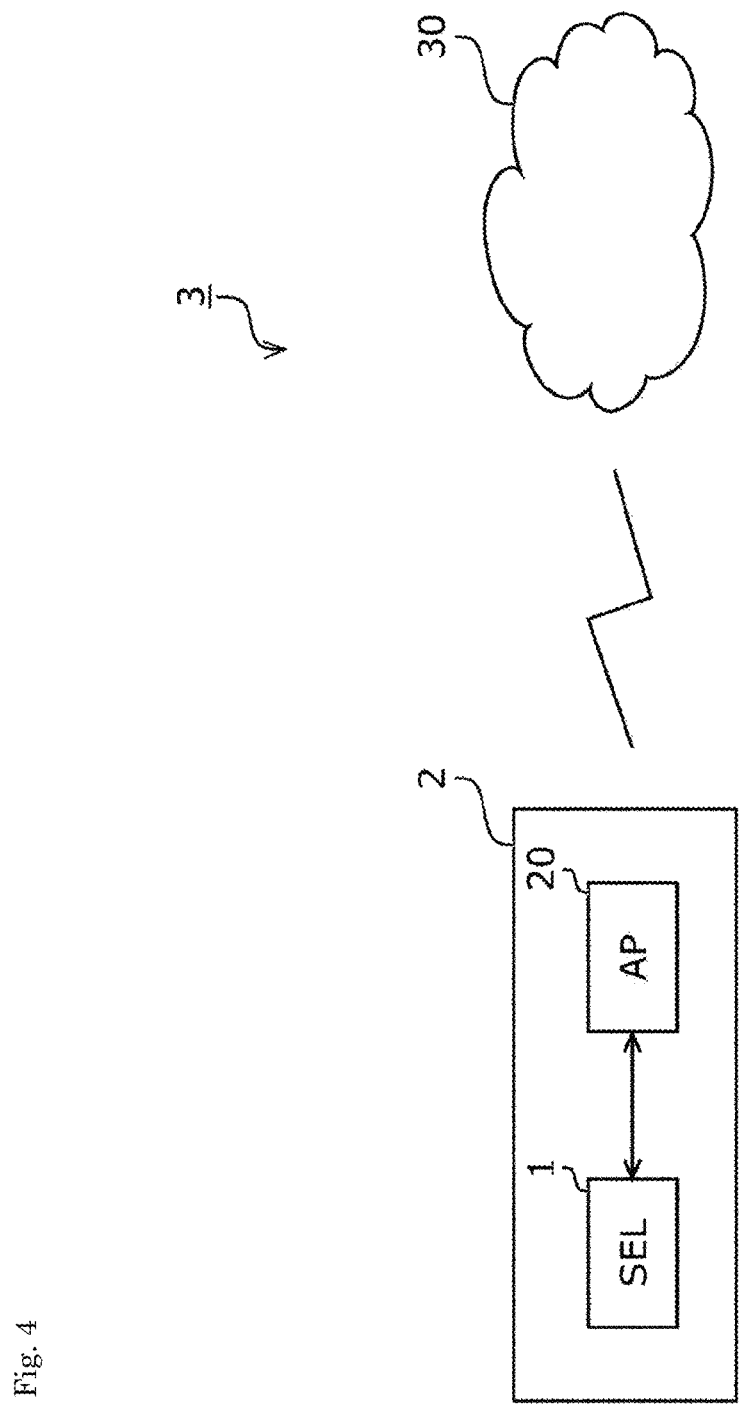
FIG. 4 is a block diagram showing an outline of an imaging system according to an embodiment.

FIG. 4 is a schematic diagram showing an example of the imaging system according to the second embodiment. An imaging system 3 includes an electronic apparatus 2 and a cloud 30. The cloud 30 is a broad concept that may be a general cloud on the Internet, or may be, for example, a server, a group of servers, or the like that is closed in an intranet. The electronic apparatus 2 is connected to the cloud 30 via, for example, a wired or wireless network.

In the first embodiment described above, the pre-processing and the retraining of the model is the processing closed in one semiconductor device, but the retraining of the model may be realized externally, of course. In this case, data may be transmitted from the electronic apparatus 2 to the server or the like in the cloud 30 at a predetermined timing. In this case, the image data to be transmitted may be encrypted in order to protect privacy and improve security.

In the cloud 30 to which the data is transmitted, it is possible to execute retraining using a CPU, GPU, or the like with higher accuracy than the CPU 13 or the like provided in the imaging device 1. Therefore, it is possible to retrain the model in the imaging device 1 while executing the recognition processing, and to execute the training in parallel on a more accurate server or the like.

In the present embodiment, for example, the parameters of the neural network model used in the DSP 12 may be transmitted together at the timing when the data is transmitted from the electronic apparatus 2 to the cloud 30. Then, the server or the like in the cloud 30 may retrain the received parameters using the received information. After that, the server or the like can optimize the image acquisition in the electronic apparatus 2 and improve the recognition accuracy by the neural network model by feeding back the parameters optimized for the electronic apparatus 2 that transmitted the data. In this way, various parameters optimized based on the output from the imaging device 1 may be deployed from the server side to the imaging device 1.

When the recognition rate drops in recognition or an abnormal value occurs, for example, the electronic apparatus 2 may transmit only the image data that causes such problems. Then, the server or the like may analyze the data that caused the decrease in the recognition rate. This data may be used to optimize the parameters of the image acquisition conditions or the model used for recognition. Further, not only the image data that causes such problems but also the image data related to the preceding and subsequent frames may be transmitted together. Here, the preceding and subsequent frames are not limited to one frame before and after the subject frame, and may include a plurality of frames.

The server or the like on the cloud 30 may accept data from a plurality of electronic apparatuses 2. In such a case, the recognition rate, the image data, and the identifier (ID) uniquely assigned to the electronic apparatus 2 may be transmitted in association. In this case, the model number of the electronic apparatus 2 may also be transmitted. By transmitting the ID in this way, it becomes possible for one server or the like to process information from a plurality of electronic apparatuses 2. Further, by transmitting the model number or the like, it is also possible to transmit parameters or the like that have undergone the same processing for an electronic apparatus having the same model number or a device having a similar imaging system.

The information to be transmitted may not be the image data itself as described above, but may be appropriate information regarding the image. For example, the imaging device 1 may include a motion detection circuit in addition to the configuration shown in FIG. 1. This motion detection circuit is a circuit for acquiring how much motion or brightness change has occurred in the acquired image. This motion detection circuit can be provided in one semiconductor device like other components. The electronic apparatus 2 may transmit the information output by the motion detection circuit output from the imaging device 1 to a server or the like. The server or the like may identify the cause of the decrease in the recognition rate by analyzing the motion detection result. The server or the like may optimize the image acquisition condition or the neural network model based on the analysis result.

The imaging device 1 may transmit information on the detection value used for exposure adjustment to a server or the like. The detection value is, for example, information regarding a change in brightness.

The recognition result of the preceding and subsequent frames and the change in the recognition rate may be transmitted from the imaging device 1 to the server or the like together with the image data of the frames before and after the image whose recognition rate has decreased. In this case, parameters related to the image quality of the preceding and subsequent frames may be transmitted at the same time. By sending these pieces of information, it is possible to analyze which parameter causes the decrease in the recognition rate on the server or the like, and it becomes possible to further optimize the model.

The imaging device 1 may transmit not only the recognition result but also the data in the intermediate layer of the neural network model. The data in the intermediate layer may be, for example, data representing a feature amount that has been dimensionally compressed, and the optimum parameters can be acquired by analyzing such data on a server or the like. As another example, backward propagation of errors may be performed from the data in the intermediate layer to optimize the encoder layer from the input layer to the intermediate layer in the neural network, or conversely, to optimize a layer that realizes recognition from the feature amount from the intermediate layer to the output layer.

In the above description, parameters and the like related to the internal state of the imaging device 1 are output, but the present invention is not limited to this. For example, data indicating the position, time, temperature, humidity, and other external environments in which the imaging device 1, that is, the electronic apparatus 2 is installed may be transmitted to a server or the like. By transmitting data related to the external environment in this way, optimization based on the external environment can also be realized.

Further, by transmitting the position information, optimization can be executed for the image acquisition conditions and the like. The position information may be, for example, GPS (Global Positioning System) information. Further, information such as a capturing angle with respect to an object of the imaging device 1 may be output. This angle may be, for example, information acquired by a gyro sensor, an acceleration sensor, or the like further provided in the imaging device 1.

Further, by transmitting the time information, it is possible to optimize the change in the recognition rate depending on the time. In this case, the imaging device 1 may be configured to control the parameters according to the time even in the case of performing normal capturing based on the program deployed from the server or the like. Of course, control of this parameter may be performed based on other external environments such as temperature and humidity.

As described above, for the processing that is expensive for the imaging device 1 to realize the processing, the imaging system 3 may perform the processing on the cloud 30.

As described above, according to the present embodiment, it is possible to perform advanced retraining using a CPU or the like having higher performance than that of the imaging device 1. Further, in this case, the server or the like may wish to further improve the accuracy by analyzing the received inference result. For example, by using the data received by the server or the like as training data, it is possible to generate a more accurate neural network model, and to acquire an image more appropriate for recognition by optimizing the image acquisition conditions.

Third Embodiment

Figure 5:
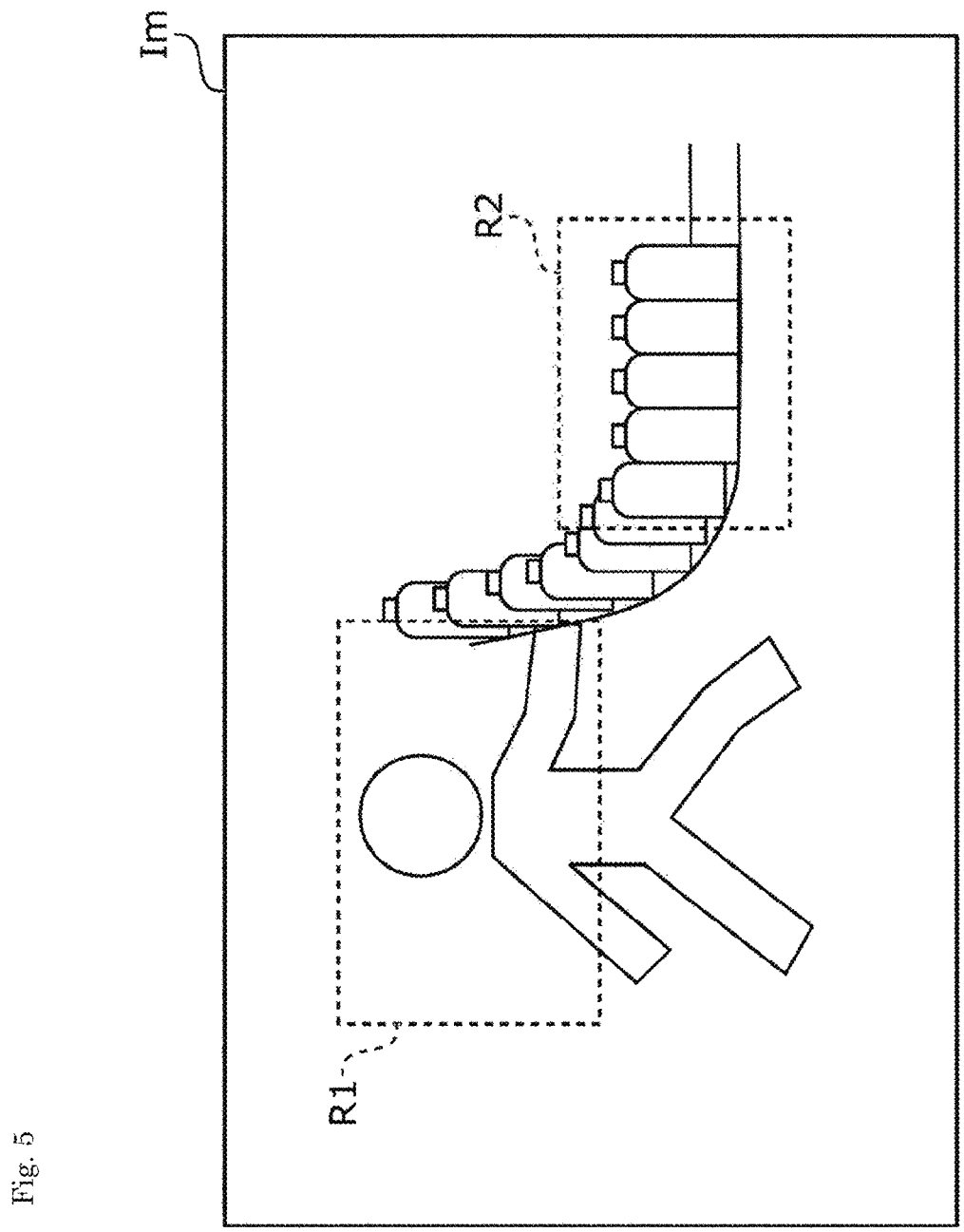
FIG. 5 is a diagram showing an example of an acquired image according to an embodiment.

FIG. 5 is a diagram showing an example of an image acquired by the imaging device 1. The image Im is, for example, an image acquired by the imaging device 1 installed in a factory that produces a bottle-shaped object. In this factory, for example, an operator processes or visually inspects bottles flowing through the line. The electronic apparatus 2 is installed so as to image the factory line in order to acquire the images of this operator and the bottles.

As described above, the operator and the bottles flowing through the line are imaged in the image Im. As described in the above-described embodiment, for example, the imaging device 1 may output image information together with the recognition result in the DSP 12. However, if all of the images are output as low-compression, high-resolution images, there is a possibility that the bandwidth for transmission and the memory area for storing the image information will be strained.

Therefore, in the present embodiment, for example, when image information is transmitted for retraining, how to reduce the amount of data and maintain the accuracy will be described.

In the imaging device 1, for example, the SEL 16 may output a part of the image information to the outside. The image data output to this outside, for example, the AP 20, is transmitted to the server on the cloud 30. The imaging device 1 may crop and output only the area necessary for recognition.

The imaging device 1 may output only the information in the region of interest (hereinafter referred to as ROI R1 or the like) in which the operator is captured, for example. In this case, the information in the area other than the ROI R1 may be deleted, only the ROI R1 may be cropped and transmitted after appropriate image processing is performed thereon. As another example, high-precision compression may be performed only within the ROI R1. For example, the ISP 11 may change the data compression method in the ROI R1 and the data compression method in other areas. The ROI R1 may be compressed by a method in which high-precision recovery can be performed but data compression cannot be performed so much. The other areas may be compressed by a method in which high-precision recovery is difficult but the data compression rate is higher than in the ROI R1.

The ROI R1 may be compressed by the same data compression method using compression parameters enabling decompression with high resolution, and the other areas may be compressed by the same data compression method using compression parameters that do not provide high resolution but can further reduce the amount of data.

As another example, raw data may be output in the ROI R1, while data compressed with a high compression rate may be transmitted in other areas.

The number of ROIs is not limited to one, and a plurality of ROIs may be present. For example, as shown in FIG. 5, the ROI R1 and the ROI R2 may be present, and the data in these ROIs may be compressed by a method that can recover the image with high accuracy differently from the compression of other regions. Moreover, it is not necessary to maintain the same accuracy between ROIs. That is, the ROI R1 and the ROI R2 may be compressed with different compression rates or by different compression methods. For example, the compression method used for the ROI R2 may be capable of recovering the image with higher accuracy than the compression method used for the ROI R1. Of course, in this case as well, the area other than the ROIs R1 and R2 may be compressed by a method that can further reduce the amount of data. Further, the image in the area other than the ROI R1 and R2 may not be transmitted.

When transmitting information in consecutive frames, the information in the ROI may be transmitted in all frames, while the information outside the ROI may be transmitted by thinning out the frames.

Then, a server or the like in the cloud 30 may optimize the image acquisition conditions or retrain the neural network model using images recovered with high accuracy, for example, high-resolution images or raw data.

As described above, according to the present embodiment, it is possible to acquire an image under appropriate image acquisition conditions in the imaging device 1 and to realize optimization of a model or the like with further improves performance outside the imaging device 1. Furthermore, it is possible to send and receive data without straining the bandwidth while continuing recognition.

(Chip Structure of Imaging Device 1)

Figure 6:
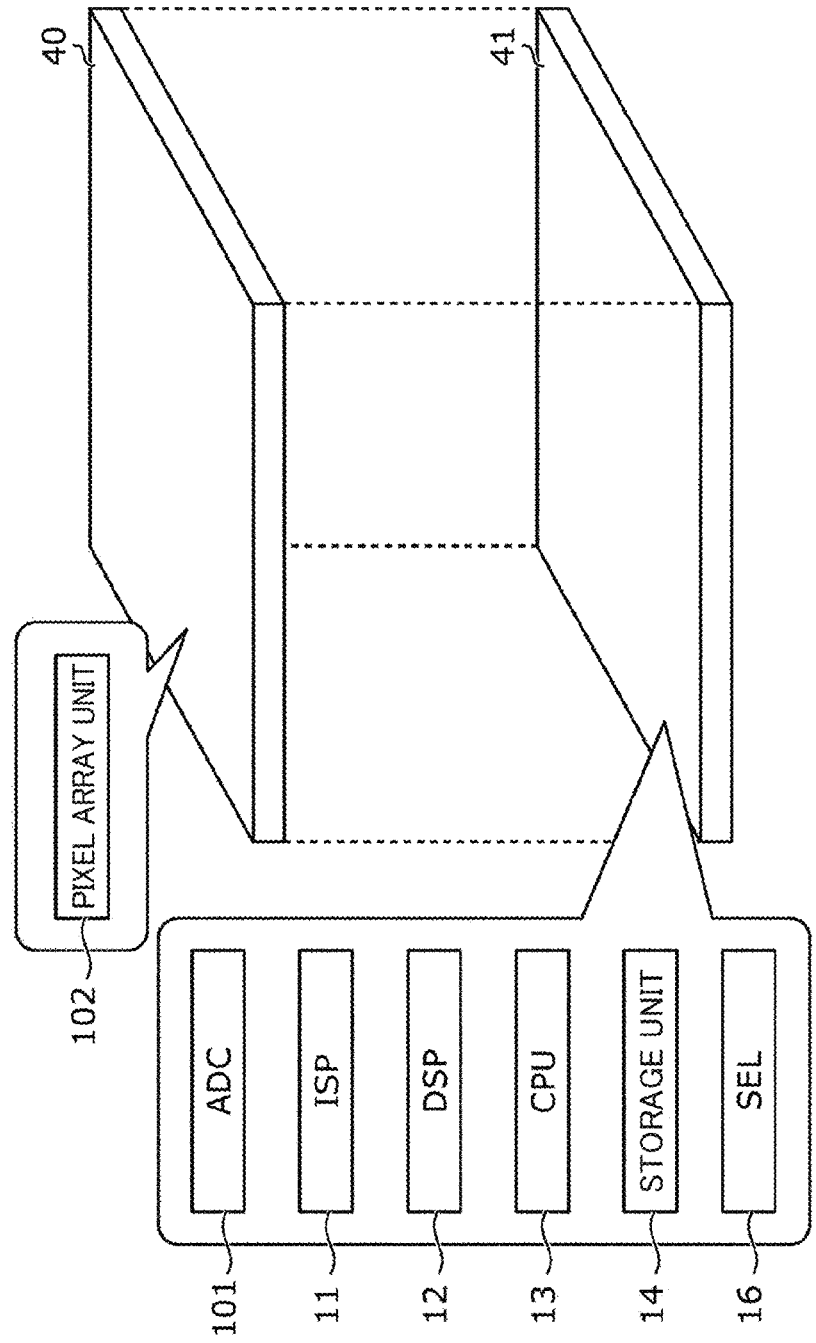
FIG. 6 is a diagram showing a configuration example of a semiconductor substrate of an imaging device according to an embodiment.

Next, a chip structure of the imaging device 1 in FIG. 1 will be described. FIG. 6 is a diagram showing an example of the chip structure of the imaging device 1 of FIG. 1. The imaging device 1 in FIG. 6 is a laminated pair in which a first substrate 40 and a second substrate 41 are laminated. The first substrate 40 and the second substrate 41 are sometimes called dies. In the example of FIG. 6, the first substrate 40 and the second substrate 41 are rectangular, but the specific shapes and sizes of the first substrate 40 and the second substrate 41 are arbitrary. The first substrate 40 and the second substrate 41 may have the same size or may be different sizes from each other.

The pixel array 102 shown in FIG. 1 is arranged on the first substrate 40. Further, at least a part of the optical system 100 of the CIS 10 may be mounted on the first substrate 40 in an on-chip manner. Further, although not shown, the shutter 15 may be mounted on the first substrate 40. For example, the shutter may be provided so as to cover the light receiving surface of the light receiving element of the first substrate 40 in the case of an optical shutter and may be provided so as to control the light receiving element of the pixel array 102 in the case of a digital shutter.

The ADC 104, ISP 11, DSP 12, CPU 13, storage unit 14, and SEL 16 shown in FIG. 1 are arranged on the second substrate 41. In addition, the second substrate 41 may be provided with components required for controlling the imaging device 1, such as an input/output interface and a power supply circuit (not shown).

The first substrate 40 and the second substrate 41 are configured as, for example, one semiconductor device that is bonded and laminated by a predetermined method. As a specific example of bonding, a so-called CoC (Chip on Chip) method may be adopted in which the first substrate 40 and the second substrate 41 are cut out from a wafer, fragmented into individual pieces, and then laminated on top of each other. Alternatively, a so-called CoW (Chip on Wafer) method may be adopted in which one (for example, the first substrate 40) of the first substrate 40 and the second substrate 41 is cut out from a wafer and fragmented into individual pieces, and the first substrate 40 is bonded to the second substrate 41 before fragmentation. Alternatively, a so-called WoW (Wafer on Wafer) method may be adopted in which the first substrate 40 and the second substrate 41 are bonded together in the state of a wafer.

For example, via-holes, micro-bumps, micro-pads, plasma bonding and the like can be used as a method for bonding the first substrate 40 and the second substrate 41. However, various other bonding methods may be used.

FIG. 6 is given as an example, and the arrangement of the components on the first substrate 40 and the second substrate 41 is not limited thereto. For example, at least one component arranged on the second substrate 41 shown in FIG. 6 may be provided on the first substrate 40. Although a laminated structure is shown, the structure is not limited to this, and a structure in which the above-mentioned components are is arranged on one semiconductor substrate may be used.

(Application to Other Sensors)

Note that although the technology according to the present disclosure is applied to the imaging device 1 (image sensor) that acquires a two-dimensional image has been exemplified in the aforementioned embodiments, the application target of the technology according to the present disclosure is not limited to the imaging device. For example, it is possible to apply the technology according to the present disclosure to various light receiving sensors such as a time of flight (ToF) sensor, an infrared ray (IR) sensor, and a dynamic vision sensor (DVS). That is, it is possible to accomplish reduction of noise included in sensor results, reduction of a sensor chip size, and the like by employing a laminated-type chip structure of the light receiving sensors.

In line with this, by executing the setting of the image acquisition conditions and the optimization of the neural network model by the above-mentioned method, the feedback processing can be executed in the state of being closed to the imaging device 1, that is, after ensuring privacy and security. Depending on the situation, it is possible to realize optimization cost-effectively and highly accurately in a server or the like on the cloud 30.

The aforementioned embodiments may have the following forms.

(1) A solid-state imaging device including: a pixel array having a plurality of pixels performing photoelectric conversion; a converter that converts an analog pixel signal output from the pixel array into digital image data; an image processing unit that performs image processing on the digital image data; a digital signal processing unit that performs recognition processing on the digital image data output by the image processing unit; and a control unit that performs optimization regarding at least one acquisition processing operation among acquisition of the analog pixel signal, acquisition of the digital image data, and acquisition of a result of the recognition processing based on the result of the recognition processing.

(2) The solid-state imaging device according to (1), wherein the control unit feeds back the result of the recognition processing to execute the optimization.

(3) The solid-state imaging device according to (2), wherein the control unit performs optimization regarding at least one acquisition processing operation among acquisition of the analog pixel signal, acquisition of the digital image data, and acquisition of the result of the recognition processing when a recognition rate of the recognition processing has decreased.

(4) The solid-state imaging device according to (2) or (3), wherein the control unit controls an exposure time of the pixels of the pixel array.

(5) The solid-state imaging device according to any one of (2) to (4), wherein the control unit optimizes parameters related to image processing of the image processing unit.

(6) The solid-state imaging device according to any one of (2) to (5), wherein the digital signal processing unit executes recognition processing using a trained neural network model.

(7) The solid-state imaging device according to (6), wherein the control unit retrains the neural network model.

(8) The solid-state imaging device according to any one of (1) to (7), further including a semiconductor device including: a first substrate on which the pixel array is arranged; and a second substrate which is laminated on the first substrate, and on which the converter, the image processing unit, the digital signal processing unit, and the control unit are arranged.

(9) The solid-state imaging device according to (8), wherein the first substrate and the second substrate are bonded by any of a CoC (Chip on Chip) method, a CoW (Chip on Wafer) method, and a WoW (Wafer on Wafer) method.

(10) The solid-state imaging device according to (8) or (9), further including a selector for selecting output from at least one of the converter, the image processing unit, and the digital signal processing unit and outputting the data to the outside.

(11) The solid-state imaging device according to (10), wherein when outputting image information, only information in a region of interest is selected and output.

(12) The solid-state imaging device according to any one of (10), wherein when outputting image information, information in a region of interest and information in the other region are output using different compression methods.

(13) The solid-state imaging device according to (12), wherein information in the region of interest and information in the other region are compressed with different compression rates and output.

(14) The solid-state imaging device according to any one of (11) to (13), wherein when the recognition rate in the recognition processing has decreased, the image information and the result of the recognition processing are output together.

(15) An electronic apparatus including: the solid-state imaging device according to any one of (9) to (14); and an application processor on a substrate independent of the semiconductor device, wherein the application processor inputs/outputs data via the selector.

(16) An imaging system including: the solid-state imaging device according to any one of (1) to (13); and a server connected to the solid-state imaging device via a network, wherein the solid-state imaging device outputs an output of the converter and/or an output of the image processing unit, with an output of the digital signal processing unit to the server in association, and the server performs optimization regarding at least one acquisition processing operation among acquisition of the analog pixel signal, acquisition of the digital image data, and acquisition of a result of the recognition processing based on the received information and deploys the optimized information to the solid-state imaging device.

Aspects of the present disclosure are not limited to the aforementioned individual embodiments and include various modifications that those skilled in the art can achieve, and effects of the present disclosure are also not limited to the details described above. In other words, various additions, modifications, and partial deletion can be made without departing from the conceptual idea and the gist of the present disclosure that can be derived from the details defined in the claims and the equivalents thereof.

Also, the present disclosure can also be applied to equipment that detects motions and performs recognition processing in the imaging device 1, such as a monitoring camera, as well as the aforementioned moving body and the medical field.

REFERENCE SIGNS LIST

1 Imaging device
10 CIS
100 Optical system
102 Pixel array
104 ADC
11 ISP
12 DSP
13 CPU
14 Storage unit
15 Shutter
16 SEL
2 Electronic apparatus
20 AP
3 Imaging system
30 Cloud
40 First substrate
41 Second substrate

The invention claimed is:
1. A solid-state imaging device comprising:
a pixel array including a plurality of pixels performing photoelectric conversion;
converter that converts an analog pixel signal output from the pixel array into digital image data;
an image processing unit that performs image processing on the digital image data;
a digital signal processing unit that performs recognition processing on the digital image data output by the image processing unit; and
a control unit that performs optimization regarding at least one acquisition processing operation among acquisition of the analog pixel signal, acquisition of the digital image data, and acquisition of a result of the recognition processing when a recognition rate of the recognition processing has decreased, wherein the recognition rate is determined based on a number of images in which a successful recognition has been made.

2. The solid-state imaging device according to claim 1, wherein the control unit feeds back the result of the recognition processing to execute the optimization.

3. The solid-state imaging device according to claim 2, wherein the control unit controls an exposure time of the plurality of pixels.

4. The solid-state imaging device according to claim 2, wherein the control unit optimizes parameters related to image processing of the image processing unit.

5. The solid-state imaging device according to claim 2, wherein the digital signal processing unit executes recognition processing using a trained neural network model.

6. The solid-state imaging device according to claim 5, wherein the control unit retrains the neural network model.

7. The solid-state imaging device according to claim 1, further comprising a semiconductor device including:
   a first substrate on which the pixel array is arranged; and
   a second substrate which is laminated on the first substrate, and on which the converter, the image processing unit, the digital signal processing unit, and the control unit are arranged.

8. The solid-state imaging device according to claim 7, wherein the first substrate and the second substrate are bonded by any of a CoC (Chip on Chip) method, a CoW (Chip on Wafer) method, and a WoW (Wafer on Wafer) method.

9. An imaging system comprising:
   the solid-state imaging device according to claim 1; and
   server connected to the solid-state imaging device via a network, wherein
   the solid-state imaging device outputs an output of the converter and/or an output of the image processing unit, with an output of the digital signal processing unit to the server in association, and
   the server performs optimization regarding at least one acquisition processing operation among acquisition of the analog pixel signal, acquisition of the digital image data, and acquisition of a result of the recognition processing based on received information and deploys the optimized information to the solid-state imaging device.

10. A solid-state imaging device comprising:
    a pixel array including a plurality of pixels performing photoelectric conversion;
    converter that converts an analog pixel signal output from the pixel array into digital image data;
    an image processing unit that performs image processing on the digital image data;
    a digital signal processing unit that performs recognition processing on the digital image data output by the image processing unit;
    a control unit that performs optimization regarding at least one acquisition processing operation among acquisition of the analog pixel signal, acquisition of the digital image data, and acquisition of a result of the recognition processing based on the result of the recognition processing;
    a semiconductor device including a first substrate on which the pixel array is arranged and a second substrate which is laminated on the first substrate, and on which the converter, the image processing unit, the digital signal processing unit, and the control unit are arranged; and
    a selector for selecting output data from at least one of the converter, the image processing unit, and the digital signal processing unit and outputting the selected output data.

11. The solid-state imaging device according to claim 10, wherein when outputting image information, only information in a region of interest is selected and output.

12. The solid-state imaging device according to claim 10, wherein when outputting image information, information in a region of interest and information in an other region are output using different compression methods.

13. The solid-state imaging device according to claim 12, wherein information in the region of interest and information in the other region are compressed with different compression rates and output.

14. The solid-state imaging device according to claim 11, wherein when a recognition rate in the recognition processing has decreased, the image information and the result of the recognition processing are output together.

15. An electronic apparatus comprising:
    the solid-state imaging device according to claim 10; and
    an application processor on a substrate independent of the semiconductor device, wherein the application processor inputs/outputs data via the selector.

* * * * *